May 15, 1951     E. H. SMITH     2,552,873

CUTTING TORCH

Filed Dec. 24, 1948

INVENTOR.
ELMER H. SMITH
BY Paul, Paul & Moore
ATTORNEYS

Patented May 15, 1951

2,552,873

UNITED STATES PATENT OFFICE 2,552,873

CUTTING TORCH

Elmer H. Smith, Minneapolis, Minn., assignor to Smith Welding Equipment Corporation, Minneapolis, Minn., a corporation of Minnesota Application December 24, 1948, Serial No. 67,116

11 Claims. (Cl. 158—27.4)

This invention relates to new and useful improvements in cutting torches and more particularly to an oxy-acetylene torch which is so constructed that the usual welding and cutting tips thereof may readily and quickly be interchanged with a minimum of effort, whereby little time need be lost by the operator when changing from one job to another, which may require the substitution of another style of tip for the one previously used.

In the operation of a cutting or welding torch it sometimes becomes necessary to substitute one tip for another, which substitution may be made necessary as a result of the original tip becoming damaged in use, or, as when changing from a welding to a cutting operation, and an object of the present invention is to provide a torch head and tip assembly which is so constructed that the tip may readily and quickly be interchanged at any time with a minimum of effort, and with the assurance that the fuel gas distributing chambers within the torch head will be sealed against leakage when the tip is secured in the torch head.

A further object is to provide a torch head and tip assembly wherein the torch head and tip are so constructed that when a tip is inserted in the bore of the torch head, axially spaced annular fuel gas distributing chambers are provided in the torch head, one of which is in communication with a suitable supply of fuel gas such as acetylene, hydrogen, propane, butane, or the like, and the other of said chambers having a connection with a suitable supply of combustion supporting gas such as oxygen.

A further object is to provide a torch head and tip assembly wherein the torch head is provided with an enlarged bore adapted to slidably receive the cylindrical rear or inlet end of the tip, when the tip is secured in position in the torch head, the diameter of the cylindrical end portion of the tip being slightly less than the diameter of said bore to substantially prevent leakage of gases therethrough, should the pressures of the different fuel gases be unbalanced.

A further object is to provide a torch head and tip assembly wherein the head is provided with an enlarged bore adapted to receive the cylindrical inlet end of the tip, and the tip having an enlarged collar thereon provided with a seat adapted to engage an annular seat on the torch head which encircles the open end of said bore, and a suitable clamping nut engaging said collar and having a threaded connection with the torch head, whereby the tip may be secured in position in the torch head by manipulation of said clamping nuts which, for convenience, may be detachably carried by the tip, and the rear or inlet end of the tip being provided with an annular seat adapted to be engaged by a tubular spring-pressed sealing element, one end of which is in communication with a supply of high pressure cutting gas, said tubular sealing element preventing leakage of the high pressure cutting gas into the fuel gas distributing chamber provided at the bottom of the bore in the torch head.

A further object is to provide a torch head and tip assembly which is extremely simple and inexpensive in construction whereby the parts thereof may be manufactured in quantity production at low cost.

A further object is to provide a simple inexpensive torch tip provided at its inlet end with an annular seat adapted to be engaged by a spring-pressed sealing element provided in the torch head.

A further and more specific object of the invention is to provide an oxy-acetylene torch assembly comprising spaced fuel gas distributing chambers, and the tip of the torch having a plurality of longitudinally extending preheating fuel gas passages therein connected by suitable cross ducts to one of said gas distributing chambers and the other of said gas distributing chambers being in communication with the preheating fuel passages in the tip of the rear or inlet end of the tip whereby a combustion supporting gas such as oxygen is simultaneously delivered into the fuel gas passages in the tip and intermixes with the acetylene therein to provide a highly combustible fuel mixture for the preheating flames.

Other objects of the invention reside in the simplicity of the tip and the inner tubular sealing element whereby these parts, particularly the tip, which sometimes must be frequently replaced, may be manufactured at low cost; in the provision of the annular restricted clearance or gap provided between the periphery of the inner cylindrical end portion of the tip and the wall of the bore in the torch head, whereby the cylindrical end portion of the tip may readily be inserted into or be removed from the torch head, and the clearance provided between said parts being such as to substantially prevent the gases passing from one distributing chamber to another, when the tip is in operation, particularly in the event the two fuel gases vary in pressure; and in the provision of all-metal sealing means for preventing leakage of the high pressure cutting gas or oxygen into the adjacent fuel gas distributing chamber in the torch head.

These and other objects of the invention and the means for their attainment will be more apparent from the following description taken in connection with the drawings.

In the accompanying drawings there has been disclosed a structure designed to carry out the various objects of the invention, but it is to be understood that the invention is not confined to the exact features shown, as various changes may be made within the scope of the claims which follow.

Figure 1:
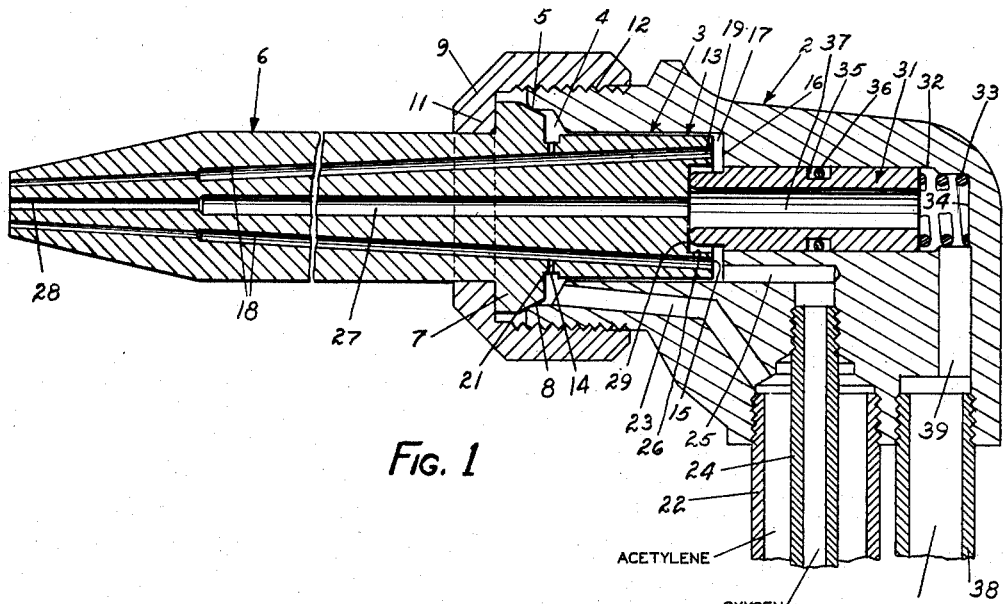
Figure 1 is a longitudinal sectional view through the torch head and tip assembly showing the tip secured in operative position in the torch head.

The novel oxy-acetylene torch assembly herein disclosed is shown comprising a torch head, generally designated by the numeral 2, shown provided with an enlarged bore 3, the wall of which is outwardly flared at the open end of the bore, as shown in Figure 1, to provide means for forming an annular fuel gas distributing chamber 4 in the torch assembly. An annular seat 5 encircles the end of the bore 3 in the torch head.

A tip, generally designated by the numeral 6, is shown provided with an enlarged collar 7 having a frusto-conical seat 8 adapted to engage the annular seat 5 of the torch head, thereby to prevent leakage of the fuel gases from the torch head, when the tip is secured therein. A clamping nut 9 has a wall portion 11 engaging the outer face of the collar 7, and is received in threaded engagement with the torch head 2, as shown at 12, whereby the frusto-conical seat of the tip may be drawn into leaktight engagement with the annular seat 5 by manually tightening the clamping nut 9.

Figure 2:
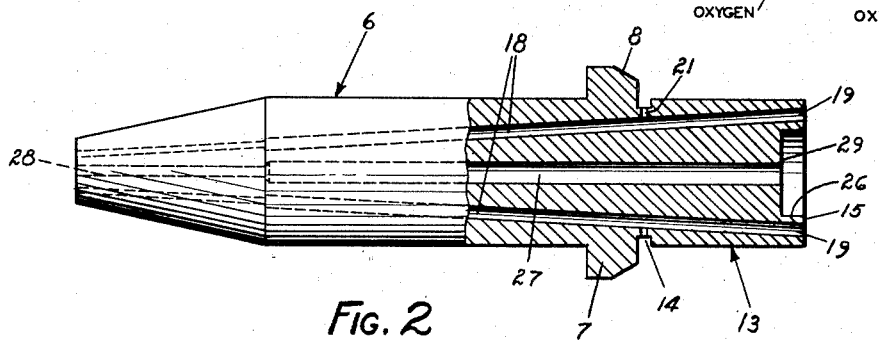
Figure 2 is a view of the tip removed from the head, partially broken away.

An important feature of the present invention resides in the construction and arrangement of the inlet end of the tip received in the bore 3. The tip, as best illustrated in Figure 2, is provided at its inlet end with a cylindrical end portion 13, which terminates adjacent to the collar 7 in an annular groove 14. The inlet or rearmost end 15 of the cylindrical end portion 13 of the tip terminates slightly short of the bottom wall 16 of the bore 3, as shown in Figure 1, thereby to provide an annular fuel gas distributing chamber 17 at the bottom of said bore.

The torch tip is shown provided with a plurality of preheating fuel gas passages 18 which extend the full length of the tip and are preferably reduced or restricted at the forward end of the tip. A plurality of cross ducts 21 connect the preheating fuel passages 18 of the tip with the annular fuel gas distributing chamber 4. The rear ends of the preheating fuel passages 18 of the tip are in direct communication with the fuel distributing chamber 17 at the bottom of the bore 3.

Figure 4:
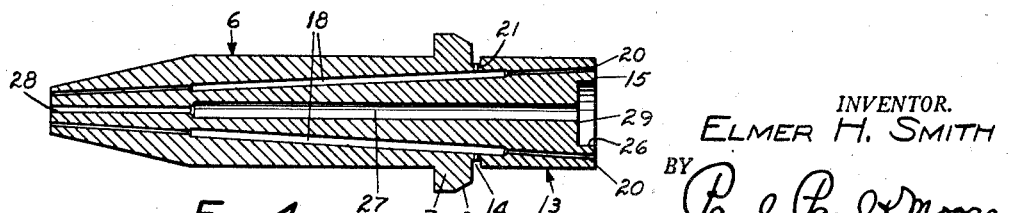
Figure 4 is a view similar to Figure 2, but showing a cutting tip wherein the rear ends of the preheating fuel passages are restricted in size to regulate the delivery of the combustion supporting gas or oxygen into said passages.

In some instances it may be deemed more effective to reduce the size of the receiving ends 19 of the preheating fuel passages 18 to approximately the size of the cross ducts 21, as shown at 20 in Figure 4. When thus sized, they may serve as metering orifices to regulate the flow of gas from the chamber 17 into the fuel gas passages 18 in the torch tip. Such construction is particularly desirable to produce an equalizing effect between the gases in the annular distributing chambers 4 and 17, and thus reduce the liability of transfer of gases through the annular passage formed between the cylindrical portion 13 and wall of the bore 3.

As best noted in Figure 1, the diameter of the cylindrical end portion 13 of the torch tip is slightly less than the diameter of the bore 3 in the torch head, whereby an annular restricted gap or clearance is provided between the periphery of the tip end portion 13 and the wall of the bore 3. This clearance permits the tip to be readily slid into or out of the bore 3 in the torch head, as when substituting one tip for another, and it also prevents the leakage of gas between the fuel gas distributing chambers 4 and 17, in the event the pressures of the gases in said chambers may vary in pressure.

Also by thus constructing the tip and the bore 3 mass production may be greatly facilitated in that slight variations in the machining of these parts will have no effect upon the operation of the torch and tip when assembled for use, as shown in Figure 1.

The annular fuel distributing chamber 4 is connected to one end of a conduit 22 by a suitable passage 23 provided in the torch head. The opposite end of the conduit 22 is connected to a suitable source of fuel gas, not shown, such as acetylene, or some other fuel gas such as hydrogen, propane, butane, or the like.

The gas distributing chamber 17 at the bottom of the bore 3 is shown connected to one end of a conduit 24 by a conduit 25. The opposite end of the conduit 24 is connected to a source of combustion supporting gas such as oxygen, not shown in the drawing. Suitable control valves, not shown, are provided at the opposite ends of the conduits 22 and 24 for regulating the flow of fuel gases to the chambers 4 and 17.

Another important feature of the invention resides in the means provided for preventing leakage of the high pressure cutting gas into the distributing chamber 17, particularly when the torch is used for cutting purposes.

Figure 3:
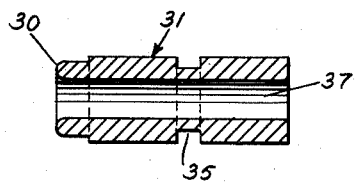
Figure 3 is a longitudinal sectional view of the tubular sealing element provided in the torch head.

As best illustrated in Figure 1, the inner end of the cylindrical portion 13 of the torch tip is shown provided with a recess 26 which is in communication with one end of a central cutting gas passage 27, extending lengthwise through the tip and preferably terminating at the opposite or forward end of the tip in a restricted cutting gas orifice 28. The bottom wall 29 of the recess 26 provides an annular seat adapted to be engaged by the adjacent end 30 of a tubular spring-pressed sealing element or sleeve 31, shown mounted in a reduced bore 32 provided in the torch head 2. The bore 32 is axially aligned with the enlarged bore 3, as shown in Figures 1 and 3.

A suitable spring 33 is interposed between the opposite end of the sealing element 31 and the wall 34 of the torch head, and exerts sufficient pressure against the seat 29 to positively prevent leakage of the high pressure oxygen from the tubular sealing member into gas distributing chamber 17.

An annular groove 35 is shown provided in the periphery of the sealing element 31 adapted to receive a suitable split lock ring 36 which serves to frictionally retain the sealing element in the bore 32, when the tip 6 is detached from the torch head. The sealing element 31 has a central passage 37 therein, one end of which is in communication with the adjacent end of the cutting gas passage 27 in the tip. The opposite end of the passage 37 is in communication with a conduit 38 through a duct 39 provided in the torch head, as shown in Figure 1. The opposite end of the conduit 38 may be connected to the source of high pressure cutting gas or oxygen to which the conduit 24 is connected.

The tubular member 31 provides a very unique all-metal seal for preventing any great leakage of the high pressure oxygen into the adjacent gas distributing chamber 17. The spring 33 constantly holds the end 30 in sealtight engagement with the seat 29 of the torch tip, and the all-metal seal thus provided assures long life, which is a very desirable feature in a torch which may require frequent inter-changing of the tip. The small amount of oxygen that may leak between the outside wall of 31 and the torch head goes into chamber 17 and augments the supply of oxygen to the fuel gas as this oxygen is reduced when the cutting valve is opened.

The provision of the annular gap or clearance provided between the periphery of the end portion 13 of the tip and the wall of the bore 3, permits the tip to be readily withdrawn from the bore 3, or inserted thereinto as hereinbefore stated, whereby the operation of inter-changing the tips may be readily and quickly performed. The annular gap or clearance also serves to provide a so-called seal between the fuel gas distributing chambers 4 and 17, whereby the combustion supporting gas or oxygen may be delivered into the distributing chamber 17 under sufficient pressure to secure uniform distribution and delivery of oxygen into the fuel gas passages 18 in the tip through the intake ends 19 at the rear end of the torch tip.

In like manner, the fuel gas or acetylene is delivered into the distributing chamber 4 under sufficient pressure to assure equal distribution and delivery of the acetylene into the fuel gas passages 18 of the torch tip through the cross ducts 21. The acetylene thus introduced into the fuel passages 18 will thoroughly intermix with the combustion supporting gas or oxygen to provide a highly combustible fuel gas mixture in each fuel passage 18, whereby the preheating flames projected from the exit end of the torch tip will be of uniform size and intensity, a highly desirable attribute in a torch of this general type.

If the supplies of fuel gases into the chambers 4 and 17 are of approximately equal pressure, the annular restricted gap because of the highly restricted condition thereof, or clearance around the cylindrical end portion 13 of the tip may have little utility as a seal. However, in the event of a variation in the pressures in the two chambers 4 and 17, the annular restricted gap will serve as a seal to prevent the leakage of gases therethrough from one chamber to another. The seal provided between the inlet or rear end of the torch tip and the adjacent end 30 of the tubular sealing element 31 is essential and is constantly maintained in order to prevent the high pressure cutting oxygen from escaping into the distributing chamber 17 when the torch is used for cutting purposes.

The recess 26 in the inner end of the tip serves primarily to protect the seat 29 against damage when handling the tip after removal from the torch head.

It will be apparent to those skilled in the art that I have accomplished at least the principal objects of my invention and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. In a torch of the class described, a head having an enlarged bore therein open at one end and a relatively smaller bore axially aligned with said larger bore, a spring-pressed tubular sealing element in said smaller bore having one end in communication with a supply of high pressure cutting gas, a torch tip provided with a cylindrical end portion slidably receivable in said larger bore and having a suitable cutting gas passage extending lengthwise therethrough and in communication with said tubular sealing element, when the tip is secured in the torch head, said tip also having a plurality of preheating fuel passages therein, means in the torch head for delivering fuel gas to said preheating fuel passages, and a seat at the inlet end of the torch tip for engaging the adjacent end of said tubular sealing element to prevent leakage of the high pressure cutting gas into the preheating fuel passages, when the torch is in operation.

2. In a torch of the class described, a head having an enlarged bore therein open at one end and a relatively smaller bore aligned with said larger bore, a spring-pressed tubular sealing element in said smaller bore having one end in communication with a supply of high pressure cutting gas, a torch tip provided with a cylindrical end portion slidably receivable in said larger bore, and having a cutting gas passage extending lengthwise therethrough and in communication with the adjacent end of said tubular sealing element, said tip also having a plurality of longitudinally extending preheating fuel gas passages, means for removably securing the tip to the torch head, complemental sealing means on the tip body and torch head for preventing leakage of the preheating fuel gases from the torch head, and an annular seat on the inlet end of the tip for engaging the adjacent end of said tubular sealing element to prevent leakage of the high pressure cutting gas into the preheating fuel gas passages, when the torch is in operation.

3. In a torch of the class described, a head having an enlarged bore open at one end and a relatively smaller bore aligned with said larger bore, a spring-pressed tubular sealing element mounted for relative longitudinal movement in said smaller bore and having one end in communication with a supply of high pressure cutting gas, a torch tip provided with a cylindrical end portion adapted to be slidably received in said larger bore, and said tip having a cutting gas passage extending lengthwise therethrough and in communication with said tubular sealing element, said tip also having a plurality of preheating fuel gas passages therein extending lengthwise through the tip, means in the torch head for supplying a suitable preheating fuel gas to the preheating fuel passages in the tip, means for removably securing the tip in the torch head, complemental sealing means on the tip body and torch head for preventing leakage of the fuel gases from the torch head, and the inlet end of the tip having an annular seat thereon for sealingly engaging the adjacent end of the tubular sealing element with sufficient pressure to seal the connection between the tip and the tubular sealing element against leakage of high pressure cutting gas, when the torch is in operation.

4. A torch tip according to claim 3, wherein means is provided for protecting the seat at the inlet end of the tip from damage, when the tip is removed from the torch head.

5. In a torch of the class described, a head having an enlarged bore therein, the wall of which is outwardly flared adjacent the open end of the bore and terminates in an annular seat, said head also having a relatively smaller bore aligned with said larger bore, a spring-pressed tubular sealing element mounted for relative sliding movement in said smaller bore and having one end in communication with a supply of high pressure cutting gas such as oxygen, a torch tip having a cylindrical end portion adapted to be slidably received in said larger bore and having its inlet end terminating short of the bottom wall of said larger bore, thereby to provide an annular fuel gas distributing chamber when the tip is secured in the torch head, means for delivering a fuel gas such as oxygen to said chamber, the diameter of said cylindrical tip portion being slightly less than the diameter of said larger bore whereby the periphery of said cylindrical tip portion is slightly spaced from the wall of the larger bore, said tip having a centrally disposed cutting gas passage extending lengthwise therethrough and communicating with said annular sealing element, an annular collar on the tip body provided with a frusto-conical seat for engaging the annular seat at the open end of the larger bore and cooperating with the outwardly flared wall portion of said larger bore to provide a second annular gas distributing chamber, means in the torch head for delivering acetylene fuel gas to said second chamber, a clamping nut engaging a face of said annular collar and having a threaded connection with the torch head for securing the tip in the torch head, and whereby the cylindrical end portion of the tip is concentrically disposed within the larger bore to provide a restricted annular gap or clearance between the periphery of the inner tip portion and the wall of the larger bore to facilitate insertion of the tip into the torch head, or its removal therefrom, and an annular seat on the inlet end of the torch tip for engaging the adjacent end of said tubular sealing element to prevent leakage of the high pressure cutting gas into the fuel gas distributing chambers.

6. In a torch of the class described, a head having an enlarged bore therein open at one end and a relatively smaller bore aligned with said larger bore, a spring-pressed metallic sealing element in said smaller bore having one end protruding therefrom into the larger bore, said sealing element having a gas passage therethrough and having its inner end in communication with a supply of high pressure cutting gas such as oxygen, a torch tip having a cylindrical end portion slidably received in said larger bore and having a cutting gas passage extending lengthwise therethrough, means for securing the torch tip to the torch head whereby the inlet end of the tip will sealingly engage the adjacent end of said metallic sealing element to seal the connection between the cutting gas passage of the tip and the passage in the metallic sealing element, means providing axially spaced annular fuel gas distributing chambers within the torch head when the tip is secured therein, one of said chambers being located adjacent to the bottom of the larger bore and having a connection with a supply of fuel gas such as oxygen, and the other of said chambers being located adjacent to the outer end of the larger bore and having a connection with a supply of fuel gas such as acetylene, a plurality of preheating fuel gas passages in the torch tip having their inlet ends in communication with the annular fuel distributing chamber at the bottom of the larger bore, cross ducts in the tip body connecting the fuel gas passages in the tip with the annular fuel distributing chamber adjacent the outer end of the larger bore, and the sliding fit between the periphery of the inner cylindrical tip portion and the wall of the larger bore permitting free sliding movement of the tip into or out of said larger bore, and preventing leakage of the fuel gases therethrough in the event the pressures of said gases are unbalanced, the engagement of the spring-pressed sealing element with the inlet end of the tip sealing the connection therebetween, to prevent leakage of high pressure cutting gas into the adjacent fuel gas distributing chamber.

7. A torch tip according to claim 6, wherein the inlet ends of the fuel gas passages in the tip are reduced in size and serve as metering orifices to equalize the distribution of the combustion supporting gas or oxygen to said passages.

8. A torch tip comprising an elongated body provided adjacent to its inlet end with an elongated cylindrical portion adapted to be received in a bore in a torch head, the inlet end of said tip having a recess therein the bottom of which constitutes an annular seat for engaging a sealing element carried in the torch head, said tip having a cutting gas passage therein extending from the bottom of said recess to the exit end of the tip, and an enlarged collar secured to the tip body and spaced inwardly from the recessed end of the tip, said collar being arranged to engage a member for securing the tip to the torch head.

9. A torch tip according to claim 8 wherein an annular seat is provided on said collar for engaging a complementary seat on the torch head.

10. In a torch of the class described, a head having an enlarged bore therein open at one end, fuel supply means in said head, a spring pressed tubular sealing element mounted in said head at the inner end of the bore and having one end in communication with said fuel supply means, a torch tip provided with a cylindrical end portion slidably receivable in said bore and having a cutting gas passage extending lengthwise therethrough and in communication with said tubular sealing element, said tip also having a plurality of longitudinally extending preheating fuel gas passages therein, means for supplying a fuel gas to said preheating fuel gas passages, means for removably securing the tip in the torch head, and an annular seat in the inlet end of the tip adapted to engage the end of said tubular sealing element to prevent leakage of the high pressure cutting gas into the fuel gas when the torch is in operation.

11. A torch tip according to claim 10, wherein the clearance between the periphery of the inner cylindrical end portion of the torch tip and the wall of the bore in the torch head is such as to reduce the liability of transfer of the gases through the annular passage formed between said cylindrical end portion of the tip and the wall of said bore.

ELMER H. SMITH.

REFERENCES CITED

The following references are of record in the file of this patent:

UNITED STATES PATENTS

| Number | Name | Date |
|---|---|---|
| 2,164,256 | Peterson | June 27, 1939 |
| 2,348,774 | Anthes | May 16, 1944 |

FOREIGN PATENTS

| Number | Country | Date |
|---|---|---|
| 506,504 | Great Britain | May 30, 1939 |